US006818897B2

United States Patent
Brown

(12) United States Patent
(10) Patent No.: US 6,818,897 B2
(45) Date of Patent: Nov. 16, 2004

(54) PHOTODIODE DEVICE AND METHOD FOR FABRICATION

(75) Inventor: Dale Marius Brown, Schenectady, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 10/656,475

(22) Filed: Sep. 4, 2003

(65) Prior Publication Data

US 2004/0041079 A1 Mar. 4, 2004

Related U.S. Application Data

(60) Division of application No. 09/793,432, filed on Feb. 27, 2001, now Pat. No. 6,646,265, which is a continuation-in-part of application No. 09/246,861, filed on Feb. 8, 1999, now Pat. No. 6,239,434.

(51) Int. Cl.[7] .......................... H01L 27/14; G02B 5/28
(52) U.S. Cl. ............................. 250/370.01; 250/370.15
(58) Field of Search ................. 250/370.01, 370.15, 250/372; 257/459, 466, 477

(56) References Cited

U.S. PATENT DOCUMENTS

| | | | |
|---|---|---|---|
| 4,358,952 A | 11/1982 | Mauer et al. | |
| 4,444,169 A | 4/1984 | Kirisawa et al. | |
| 4,919,099 A | 4/1990 | Extance | |
| 5,071,106 A | 12/1991 | Helkenberg | |
| 5,125,739 A | 6/1992 | Suarez-Gonzalez et al. | |
| 5,130,776 A | 7/1992 | Popovic et al. | |
| 5,182,670 A | 1/1993 | Khan et al. | |
| 5,186,146 A | 2/1993 | Sohma et al. | |
| 5,249,954 A | 10/1993 | Allen et al. | |
| 5,659,133 A | 8/1997 | Sims et al. | |
| 5,757,250 A | 5/1998 | Ichikawa et al. | |
| 5,834,331 A | 11/1998 | Razeghi | |
| 6,104,074 A | 8/2000 | Chen | |

FOREIGN PATENT DOCUMENTS

| | | |
|---|---|---|
| DE | 3839537 | 5/1990 |
| EP | 0417409 A2 | 6/1990 |
| EP | 0417409 A | 3/1991 |
| JP | 60036825 | 8/1983 |
| JP | 59027581 A | 2/1984 |
| JP | 60036825 A | 2/1985 |
| JP | 19950032538 | 2/1995 |

OTHER PUBLICATIONS

Edward C. Rea, Jr., "Rapid–Turning Laser Wavelength Modulation Spectroscopy With Applications in Combustion Diagnostics and OH Line Shape Studies", HTGL Report T–272, High Temp. Gasdyn Lab, Dept. Mech. Eng., Stanford University, Stanford, CA, pp. 318–322, Mar. 1991.

Luque, et al, "LIFEBASE: Database and Spectral Simulation Program", Version 1.6, SRI Report No. MP 00–009 (1999).

Dale M. Brown, US patent application, "Optical Spectrometer and Method for Combustion Flame Temperature Determination", Ser. No. 09/561,885 filed May 1, 2000, now US patent 6,350,988 issued Feb. 26, 2002.

Primary Examiner—Constantine Hannaher
Assistant Examiner—Otilia Gabor
(74) Attorney, Agent, or Firm—Ann M. Agosti; Patrick K. Patnode

(57) ABSTRACT

A photodiode device includes a silicon carbide photodiode including a second semiconductor layer on a first semiconductor layer and an integral aluminum gallium nitride filter on the second semiconductor layer. A method for fabricating a photodiode device for combustion flame temperature determination includes fabricating an integral filter over a silicon carbide photodiode. Examples of various filter fabrication techniques include growing an aluminum gallium nitride filter, fabricating a silicon oxynitride filter, and alternating thin film layers of silicon oxide and silicon nitride.

6 Claims, 3 Drawing Sheets ively low.

PHOTODIODE DEVICE AND METHOD FOR FABRICATION

CROSS REFERENCE TO RELATED APPLICATIONS

This application is a division of application Ser. No. 09/739,432, filed Feb. 27, 2001 and issued as U.S. Pat. No. 6,646,265 on 11 Nov. 2003, which is a CIP of application Ser. No. 09/246,861 filed on Feb. 8, 1999, now U.S. Pat. No. 6,239,434, issued May 29, 2001.

BACKGROUND

The invention relates generally to optical flame detection.

Flame temperature sensors are needed for controlling a wide range of combustion processes. Some combustion processes that require tight control of fuel-to-air ratios for increased fuel burning efficiency and reductions in emission pollution are present in, for example, building heating systems, jet aircrafts, locomotives, and fossil fueled electric power plants and other environments wherein gas and/or steam turbines are used.

Unnecessarily high combustion temperatures can compromise fuel efficiency and increase emission pollution. For example, in a gas turbine designed to emit nine nitrogen oxide (NOx) particles per million (ppm), an increase from 2730° F. (1499° C.) to 2740° F. (1504° C.) reduces turbine efficiency by about two percent and increases NOx emissions by about two ppm.

Previous silicon carbide flame detectors such as described in commonly assigned Brown et al., U.S. Pat. No. 5,589,682, issued 31 Dec. 1996, detect the presence of a flame and measure the intensity of the flame's photon flux over a wide range of wavelengths. The measured intensity, however, does not always correlate to flame temperature, particularly in multiple flame combustors.

In commonly assigned, Brown, U.S. application Ser. No. 09/561,885, filed 1 May 2000, a continuation in part of aforementioned Brown, U.S. application Ser. No. 09/246, 861, an optical spectrometer for combustion flame temperature determination includes at least two photodetectors positioned for receiving light from a combustion flame and having different overlapping optical bandwidths for producing respective output signals; and a computer for obtaining a difference between a first respective output signal of a first one of the at least two photodetectors with respect to a second respective output signal of a second one of the at least two photodetectors, dividing the difference by one of the first and second respective output signals to obtain a normalized output signal, and using the normalized output signal to determine the combustion flame temperature.

Commonly assigned, Brown, U.S. application Ser. No. 09/561,885, disclosed that gallium nitride, aluminum nitride, and aluminum gallium nitride were promising photodetector materials. More specifically, gallium nitride has a maximum wavelength of absorption of about 365 nanometers (that is, is transparent for wavelengths longer than 365 nanometers); Aluminum nitride has a maximum wavelength of absorption of about 200 nanometers; and a class of alloys of GaN and AlN designated $Al_xGa_{x-1}N$ are direct bandgap materials with bandgaps variable between the two extremes of GaN and AlN depending on the amount of aluminum in the alloy. The semiconductors of these alloys have optical transitions directly from valance band to conduction band and do not require phonon assistance for transitions (as compared with silicon carbide where such assistance is required). The cutoff in responsivity is therefore sharp and thus provides for high resolution.

For maximum accuracy, dark currents of photodiodes used in combustion flame temperature detection are preferably on the order of less than or equal to about 100 picoamperes per centimeter squared ($pA/cm^2$). Generally gallium nitride and aluminum gallium nitride photodiodes have dark currents on the order of nanoamperes per centimeter squared ($nA/cm^2$) to microamperes per centimeter squared ($\mu A/cm^2$). Furthermore, yield of good gallium nitride and aluminum gallium nitride photodiodes is relatively low.

SUMMARY

It would be desirable to provide a solid state flame temperature sensor for combustion control systems with low dark current and with a flame temperature accuracy within about 20° F. (11° C.) in the temperature range of about 2500° F. (1371° C.) to about 3500° F. (1927° C.).

Briefly, in accordance with one embodiment of the present invention, a solid state optical spectrometer for combustion flame temperature determination comprises: a first photodiode device for obtaining a first photodiode signal, the first photodiode device comprising a silicon carbide photodiode and having a range of optical responsivity within an OH band; a second photodiode device for obtaining a second photodiode signal, the second photodiode device comprising a silicon carbide photodiode and a filter, the second photodiode device having a range of optical responsivity in a different and overlapping portion of the OH band than the first photodiode device; and a computer for obtaining a ratio using the first and second photodiode signals and using the ratio to determine the combustion flame temperature.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

DETAILED DESCRIPTION

Figure 1:
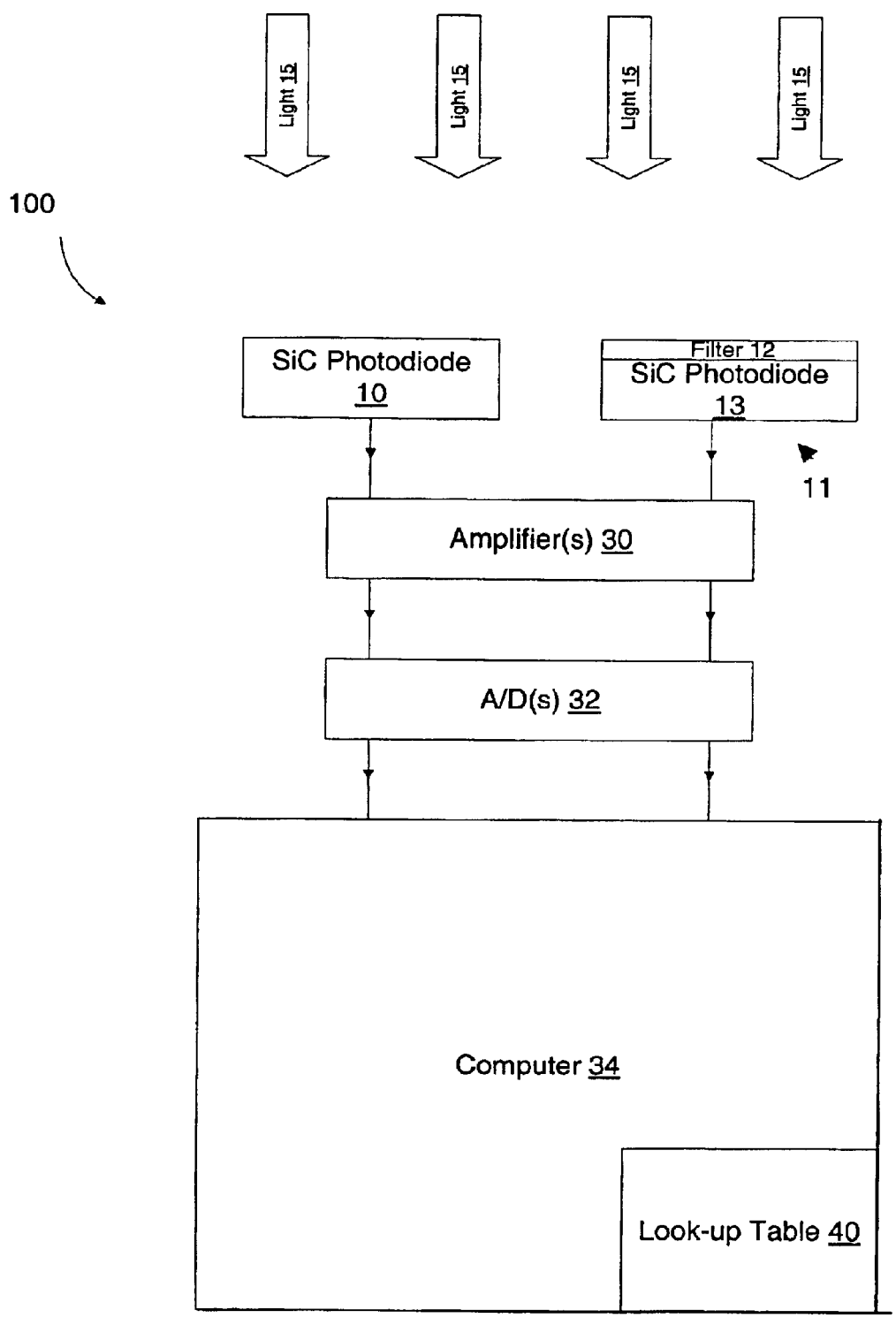
FIG. 1 is a block diagram of one example embodiment of the present invention.

FIG. 1 is a block diagram of one example embodiment of the present invention wherein a solid state optical spectrometer 100 for combustion flame temperature determination comprises a first photodiode device 10 for obtaining a first photodiode signal, the first photodiode device comprising a silicon carbide photodiode and having a range of optical responsivity in an OH band; a second photodiode device 11 for obtaining a second photodiode signal, the second photodiode device comprising silicon carbide photodiode 13 and a filter 12, the second photodiode device having a range of optical responsivity in a different and overlapping portion of the OH band than the first photodiode device; and a computer 34 for obtaining a ratio using the first and second photodiode signals and using the ratio to determine the combustion flame temperature.

Wide bandgap (Eg≈3ev) SiC photodiodes typically have responsivities of at least 50 mA/Watt for ultraviolet wavelengths between 200 nanometers (nm) and 350 nm with a responsivity peak at 270 nm of 150 mA/Watt. At 400 nm, the responsivity falls towards zero because the wide bandgap eliminates any possibility of photon absorption for longer wavelengths. SiC photodiode dark current at 482° F. (250° C.) is very low and is typically no greater than 1 pA/cm$^2$ at one volt reverse bias with an internal impedance of $10^{14}$ ohms, for example. Additionally, SiC photodiode fabrication techniques have higher yields than present gallium nitride photodiode fabrication techniques. Another advantage of an SiC photodiode is that the responsivity is relatively insensitive to device structure so long as the epitaxial layer (not shown) of the photodiode is sufficiently thick (greater than or equal to about 5 micrometers, for example).

SiC photodiodes typically have DC output components with large dynamic ranges on the order of about 5000 to 1 or greater. Furthermore, SiC photodiodes have AC output components that can be used to track flame dynamics that produce acoustic vibrations, for example. Additionally, SiC photodiodes have sufficiently high sensitivity to monitor flames even when oil fuel is used and/or steam injection is applied for power augmentation.

The OH emission band for wavelengths centered near 308 and 309 nanometers (nm) (or, more broadly, within the range of about 260 nm to about 350 nm) includes a series of fine emission lines which are produced by various transitions between energy levels of the OH molecule. Both rotational and vibrational transitions occur. The OH molecules in combustion flames are at thermal equilibrium and have emission characteristics which reflect the combustion flame temperature. The overlap of SiC photodiode responsivity versus wavelength with a hydrocarbon flame's strong OH band at 310 nm is beneficial. Because SiC becomes transparent at about 400 nm, the black body radiation from hot combustor walls does not blind or interfere with the detection of even dim flames. Therefore, long wavelength-blocking filters are not required. The OH emission band is essentially isolated from weaker emission lines produced by other excited radicals within a combustion flame.

The temperature dependence in the OH emission band can be seen, for example, in FIGS. 3–6 of aforementioned Brown, U.S. application Ser. No. 09/561,885. A spectrometer can be used, for example, to determine a hydrocarbon flame's temperature by measuring the intensity of the various spectral lines within the OH band.

Figure 2:
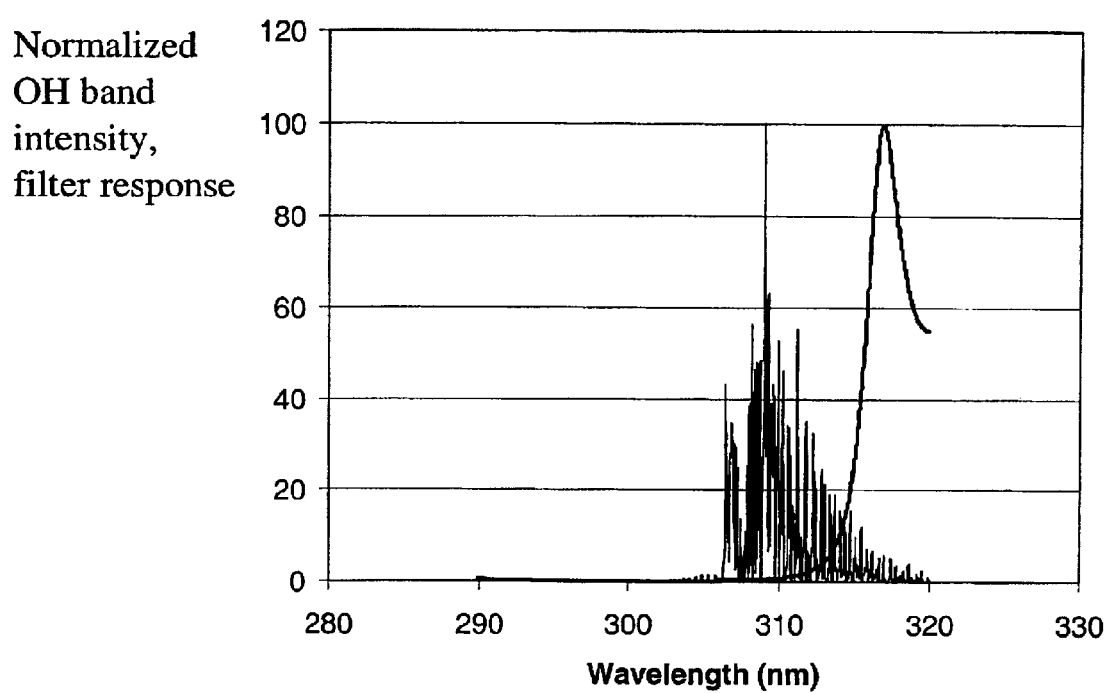
FIG. 2 is a graph of example filter properties for use in an embodiment of the present invention.

Ultraviolet (UV) filter technology has advanced in recent years. In one embodiment of the present invention, an integral filter is used. One type of filter, for example, that can be useful as an integral filter and that is compatible with high temperature operation (equal or above about 302° F. (150° C.), for example) is a filter comprising silicon oxide and silicon nitride (either mixed together in the form of silicon oxynitride or in separate films). In a more specific embodiment, the filter comprises multiple alternating layers of silicon oxide $SiO_2$ and silicon nitride $Si_3N_4$ films. In one embodiment, starting with silicon oxide, forty one alternating layers of silicon oxide and silicon nitride are deposited to a total coating thickness of about 1.6 microns to form a high pass filter. Preferably the films are deposited by computer-controlled chemical vapor deposition. An example of useful filter properties is shown in FIG. 2.

Another useful type of filter, for example, comprises aluminum gallium nitride (AlGaN). Using an aluminum gallium nitride filter with a silicon carbide photodiode is advantageous for both single photodiode device embodiments and multiple photodiode device embodiments (FIG. 1) because aluminum gallium nitride semiconductors are direct bandgap materials and have a sharp transition between optical opaqueness and optical transparency. Thus, a photodiode device can have the benefits of silicon carbide photodiode ease of manufacturability and performance properties and the benefits of aluminum gallium nitride optical transition properties. In one embodiment, an integral aluminum gallium nitride filter is epitaxially grown to a thickness of about two micrometers with a concentration of aluminum ranging from about fifteen percent to about thirty-five percent or, more specifically, from about twenty percent to about twenty five percent. In another embodiment, the aluminum gallium nitride filter is not integral to the photodiode and instead can be deposited on a transparent substrate (not shown), for example. In either embodiment, photons with wavelengths shorter than about 310 nanometers are absorbed by the filter and wavelengths longer than about 310 nanometers pass through the aluminum gallium nitride filter and are absorbed by the silicon carbide photodiode. Although 310 nm is used for purposes of example, the cutoff frequency is not limited to 310 nm and is typically within the range of about 260 nm to about 350 nm. The responsivity of the resulting photodiode device can be tailored by adjusting the amount of aluminum in the filter.

Figure 3:
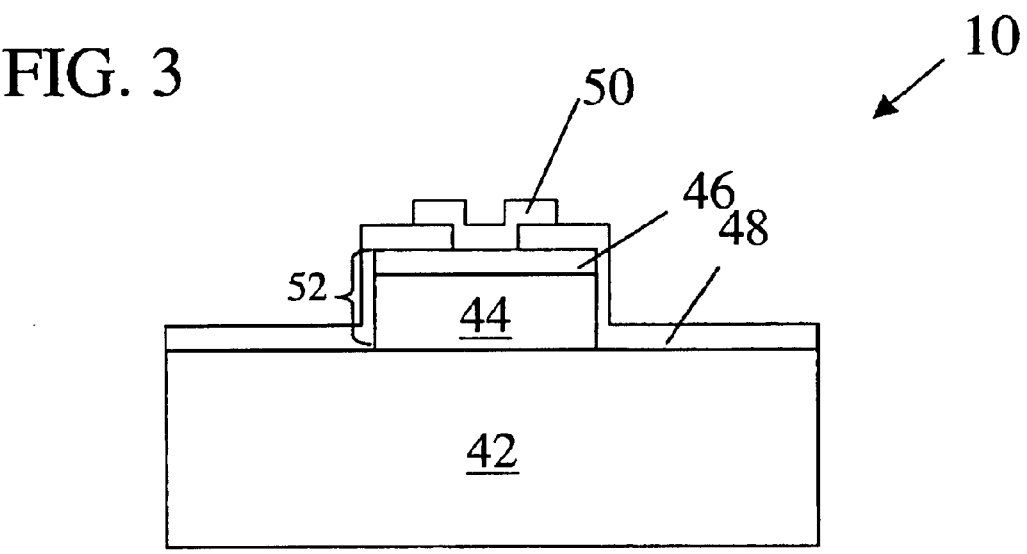
FIGS. 3 and 4 are sectional side views of example photodiode devices for use in an embodiment of the present invention.
Figure 4:
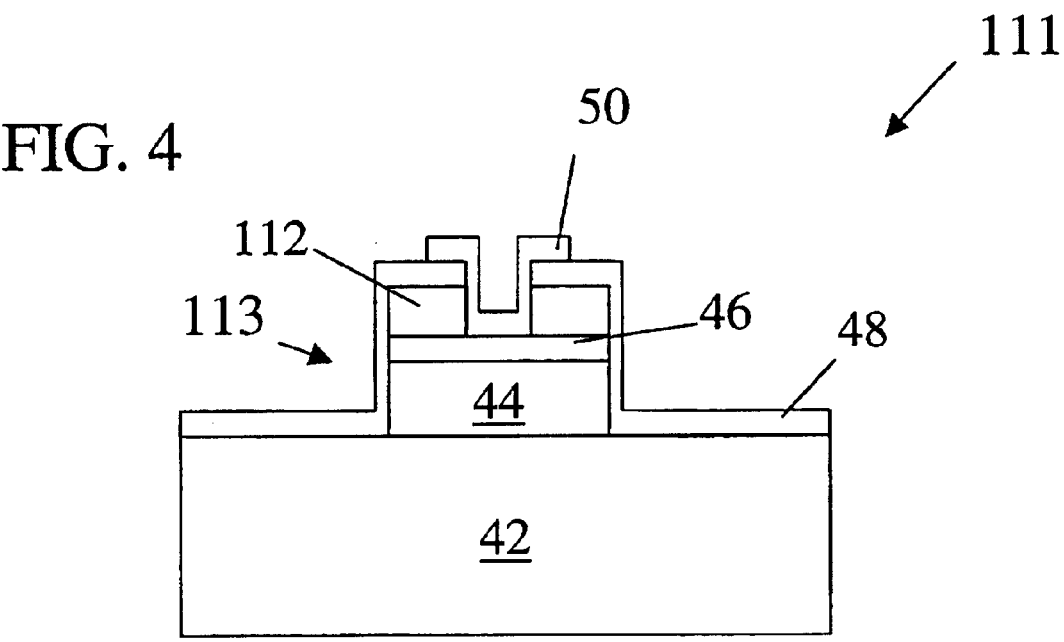

FIGS. 3 and 4 are sectional side views of example photodiode devices for use in an embodiment of the present invention. With respect to photodiode device 10 of FIG. 3, as described in commonly assigned Brown et al., U.S. Pat. No. 5,394,005, in one embodiment, a p or n type conductivity substrate 42 (and each of semiconductor layers 44 and 46 which are grown thereon) comprises appropriately doped 6H type crystalline silicon carbide.

First layer 44 is grown on the substrate to a thickness between about 1 micrometer and about 5 micrometers and is typically lightly doped with aluminum to form a p-layer. The specific thickness of first layer 44 determines sensitivity of the photodiode to optical wavelengths. Second layer 46 (typically a thin layer having a thickness of about 0.1 μm to 0.3 μm) is typically epitaxially grown on first layer 44 and is heavily doped with nitrogen to n+ conductivity to form a p-/N+ junction. After second layer 46 is applied and the device structure is formed by etching a mesa 52, for example, a suitable passivation layer 48 (typically comprising silicon dioxide, for example) may be thermally grown and/or deposited and etched to expose at least a contact region on second layer 46. Then contact metallization 50 can be applied to the exposed contact region.

Photodiode device 111 of FIG. 4 can be fabricated in a similar manner as discussed with respect to photodiode device 10 of FIG. 3 with the addition of an integral filter 112 between second layer 46 and passivation layer 48. A photodiode device constructed by this technique combines both filtering and photon conversion within a single unit to enhance the feasibility of the solid state spectrometer.

Although two photodiode devices are shown in FIG. 1, there is no maximum number of photodiode devices. Additional photodiode devices may provide more accurate results at the expense of equipment and complexity of calculations.

As stated above, second photodiode device 11 (including filter 12) has a range of optical responsivity in a different and overlapping portion of the OH band than first photodiode device 10. In a more specific embodiment, the first photodiode device produces a signal that is a measure of the total intensity of the OH band whereas the second photodiode device produces a signal that intersects the OH band and thereby allows for partitioning of the band. A ratio of these measurements can be used to determine flame temperature.

If desired, signal amplification can be provided by sending signals from the photodiode devices into amplifier(s) 30 (one multiplexing amplifier or a number of separate amplifiers). In one embodiment, the spectrometer further includes at least one analog-to-digital converter 32 for converting the amplified signals from analog signals to digital form.

After the ratio is obtained, computer 34 can use a look-up table 40 for using the ratio to determine the combustion flame temperature, for example. The look-up table is expected to have sensitivity adequate for detecting about ±20° F. (11° C.) changes in flame temperature. More specifically, the change in ratio R(T) for each 20° F. (11° C.) change in temperature is expected to be about 1%.

In one embodiment, a look-up table can be generated by performing calculations at a plurality of different temperatures using a first set of well known spectral line strengths ($S_j$) associated with respective wavelengths (j) and a second set of well known spectral line strengths ($S_i$) associated with respective wavelengths (i). Each line strength is multiplied by a respective quantum mechanical form of the Black body radiation law ($R_j$ or $R_i$, respectively) and by a respective photodiode responsivity ($X_j$ or $X_i$, respectively), and the multiplied line strengths are summed into a respective first or second summation $$\left( \sum_j R_j X_j S_j \text{ or } \sum_i R_i X_i S_i, \text{ respectively} \right).$$

One of the first and second summations is then divided by the other of the first and second summations:

$$F(T) = \frac{\sum_i R_i X_i S_i}{\sum_j R_j X_j S_j}.$$

In one embodiment, the set of lines i represents a smaller subset of the set of lines j. Interpolation can be used to generate values for temperatures between values that are calculated.

In another more specific embodiment, the look-up table is a look-up table fabricated by performing the following calculations at a plurality of different temperatures: multiplying each of a first set of spectral line strengths ($S_j$) associated with respective wavelengths (j) by a respective quantum mechanical form of the Black body radiation law ($R_j$) and by a respective photodiode responsivity ($X_j$), and summing the multiplied line strengths into a respective first summation; multiplying each of a second set of spectral line strengths ($S_i$) associated with respective wavelengths (i) by a respective quantum mechanical form of the Black body radiation law ($R_i$), and by a respective photodiode responsivity ($X_i$), and by a respective optical transparency ($Y_i$) of the integral filter, and summing the multiplied line strengths into a respective second summation; and dividing one of the first and second summations by the other of the first and second summations:

$$R(T) = \frac{\sum_i Y_i R_i X_i S_i}{\sum_j R_j X_j S_j}.$$

The filter properties of $Y_i$ can be generated by obtaining experimental filter data or by modeling calculations for the filter, for example. In one embodiment, the set of lines i represents the same set as the set of lines j.

In the event that an optical window (not shown) for the photodiode devices becomes dirty from the combustion environment or that attenuation occurs for other reasons, the signal reduction for each band will be proportionally reduced but the intensity ratios will remain an accurate temperature indicator regardless of the substrate or window conditions and the system will be self-compensating.

If a multiplexer is used for the amplification and/or the A/D conversion, then the computer will include memory for storing individual output signals. It is further useful for the computer to perform long term time averaging of the output signals so as to reduce effects of noise (improve the signal-to-noise ratio). Such time averaging could occur on the order of seconds, minutes, or hours, for example. In one embodiment, the time averaging is accomplished by charge integration of the amplified photodiode signals prior to digitization. Flame temperature is the primary factor that characterizes the combustion process. If the flame temperature is known, closed loop control can be used to optimize the fuel-to-air ratio for maximizing combustion efficiency and minimizing nitrogen oxide and carbon monoxide emissions produced by combustion. The system can be designed to sense flame outs or ignitions rapidly. Information as to flame presence and average temperature can be directed simultaneously on a real time basis to a control system of the computer.

EXAMPLE

In one example, a 1×1 mm² SiC photodiode with responsivities of about 100 mA/watt at 310 nm is expected to have signal levels varying between about 2 nA and about 20 nA. Signal levels will vary depending on the angle or field of view afforded by a photodiode that is mounted in a combustor chamber, on the flame intensity, and on the optical angle or field of view (typically about 4 degrees for conventional SiC photodiode sensor assemblies).

In such an embodiment, the change in photodiode intensity level for a 20° F. (11° C.) temperature changed is expected to be about 0.4% for the unfiltered photodiode device and about 2% for the filtered photodiode device with a change in signal ratio of about 1%. The signal levels of the filtered photodiode device are expected to be about 5% of the total signal produced by the unfiltered photodiode device. Therefore, if the signal levels produced are between 2 and 20 nA, the photodiode devices must be able to accurately sense changes as small as a few picoamperes. The dark current of conventional 1×1 mm² SiC photodiode is three orders of magnitude less than a few picoamperes in that it is only a few fentoamperes at the low voltages required for the front end of an operational amplifier circuit. These properties make SiC photodiodes capable of detecting very low levels of photo flux and producing a zero offset and a low noise amplifier front end.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A photodiode device comprising:
   a silicon carbide photodiode comprising a second semiconductor layer on a first semiconductor layer; and
   an integral aluminum gallium nitride filter on the second semiconductor layer.

2. The photodiode device of claim 1 further comprising a passivation layer on the integral filter.

3. The photodiode device of claim 2 wherein the first and second semiconductor layers comprise 6H type crystalline silicon carbide layers.

4. A method for fabricating a photodiode device for combustion flame temperature determination comprising fabricating an integral filter over a silicon carbide photodiode, wherein fabricating the integral filter comprises growing an aluminum gallium nitride filter.

5. A method for fabricating a photodiode device for combustion flame temperature determination comprising fabricating an integral filter over a silicon carbide photodiode, wherein fabricating the integral filter comprises fabricating a silicon oxynitride filter.

6. A method for fabricating a photodiode device for combustion flame temperature determination comprising fabricating an integral filter over a silicon carbide photodiode, wherein fabricating the integral filter comprises alternating thin film layers of silicon oxide and silicon nitride.

* * * * *